July 31, 1956  B. J. FARROW  2,756,623
SCREW-CUTTING LATHES
Filed March 9, 1954

INVENTOR
BENJAMIN JOHN FARROW
BY
Young, Emery & Thompson
ATTORNEYS

United States Patent Office 2,756,623
Patented July 31, 1956

2,756,623

SCREW-CUTTING LATHES

Benjamin J. Farrow, Wimborne, Dorset, England

Application March 9, 1954, Serial No. 415,129

Claims priority, application Great Britain March 16, 1953

2 Claims. (Cl. 82—23)

This invention relates to apparatus for use with a screw cutting lathe for controlling the incidence of commencement of successive cuts.

According to the present invention the apparatus comprises engagement means for engaging the lathe carriage with the lathe lead screw, abutment means for preventing movement of said means to the engagement position until a given position of the lead screw recurs, and gear means operatively connecting the abutment means with the lead screw.

In a constructional form of the invention said abutment means comprises a disc having at least one slot in its periphery, said disc is mounted on a spindle in the apron of the lathe, the said gear means consists of a pinion on said spindle in gear with the lead screw, and said abutment means consists of a pin connected to a movable engagement lever so as to ride on said periphery with the carriage disengaged until the pin moves into the slot whereupon engagement is effected.

The said constructional form of the invention will now be described by way of example in greater detail with reference to the accompanying diagrammatic drawings wherein.

Figure 1:
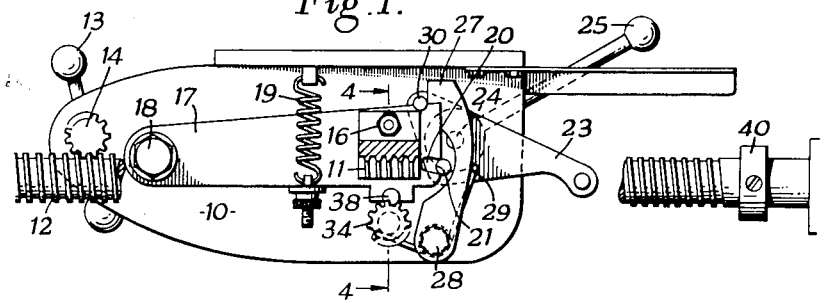
Figure 1 is a rear view of a lead screw and an apron with apparatus attached thereto made in accordance with the invention.

The apron 10 is to be attached to the carriage of a lathe in usual manner, and has a half-nut 11 to be engaged with a lead screw 12 for traversing the carriage and tool thereon along the work for cutting the thread. The apron carries the usual traversing handle 13 geared by pinion 14 to a rack on the side of the lathe bed.

The half-nut 11 is mounted by a bolt 16 on a lever 17 that is pivoted at 18 on the apron. The lever is urged by a spring 19 in its disengagement direction and is provided with a slot 20 engaged with slight play by a pin 21 for moving it positively into engagement. The pin 21 is carried by a lever 23 that is pivoted on a stud 24 in the apron. An engagement arm 25 is connected to the stud.

A locking pawl 27 is pivoted to the apron at 28 and is urged by a spring 29 to bring the nose of the pawl over the end of the lever 17 to lock the parts in the position of engagement as shown in Figure 1. The lever 23 carries a pin 30 which pushes the pawl off the lever 17 during the disengagement movement.

The apron is provided with a boss 32 in which is mounted a spindle 33 that carries a pinion 34 on its inner end that engages the lead screw, and carries an abutment plate 35 on its outer end which has one or more slots 36 in its periphery disposed in positions corresponding to recurring positions on the lead screw.

The lever 17 carries a pin 38 that passes through a slot 39 in the apron and can ride on the periphery of the plate 35.

Figure 2:
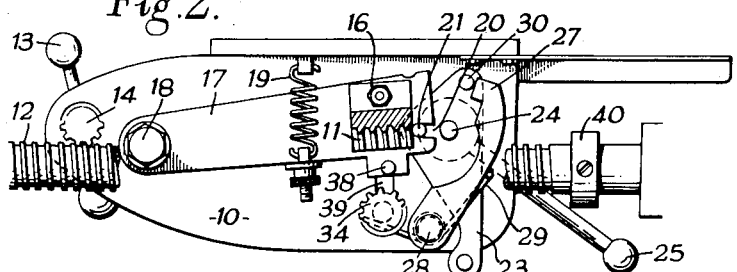
Figure 2 is a similar view but showing the parts in a different position.
Figure 3:
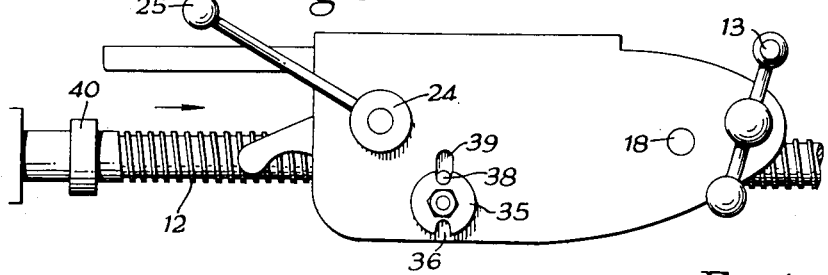
Figure 3 is a front view thereof.
Figure 5:
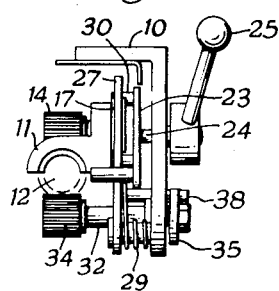
Figure 5 is an end view looking in the direction of the arrow in Figure 3.
Figure 4:
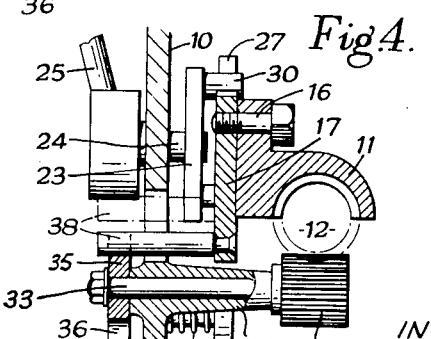
Figure 4 is a sectional view on the line 4—4 on Figure 1.

In operation, commencing with the parts in the positions of disengagement shown in Figure 2, the operator presses the arm 25 upwards so that the pin 21 presses the lever 17 down until the pin 38 engages in the slot 36 or engages the periphery of the plate 35. If the pin engages in the slot all the parts move to the engagement position of Figure 1 as the slot will be in a position corresponding to the correct lead screw position for starting a cut. If the slot 36 is not so positioned the pin 38 will ride on the periphery of the abutment plate 35 until the correct starting position of the lead screw is reached whereupon the pin 38 will enter the slot and engagement will be effected. As can be seen in the drawing the relative positions of the pin 21, slot 20, and pivot 18 are such that movement of the lever 17 will also move the pin 21 and arm 25. Thus when the operator applies finger pressure on the arm 25 to hold pin 38 on the plate 35, if the pin 38 fails to enter slot 36 fully the surfaces of slot 36 will push out the round pin 38 and this movement will be transmitted through the pin 21 to the arm 25 and will be felt by the operator who will thus know that the engagement has not been effected.

At the end of the cut the end of the lever 23 will engage a stop collar 40 on and adjustable along the lead screw whereby the lever 23 is turned downwards. This causes the pin 30 to push the pawl 27 off the lever 17 and the latter is then immediately drawn up by the spring 19 to disengage the half-nut from the lead screw; at the same time, the slot 20 moves the pin 21 so as to move the engagement lever 25 to its disengaged position.

The positions and number of the slots 36 and the number of teeth on the pinion 34 will be selected according to requirements. For example the pinion 34 having 16 teeth and used with a lead screw having 8 threads per inch and two slots 36 is suitable for cutting any pitch having a whole number to the inch. By using only one slot 36, pitches can be engaged where the pitch is a whole number and a half threads per inch. With 32 teeth on the pinion smaller pitch fractions can be dealt with.

If the pin 38 be removed, the lathe can then be operated in the normal way.

I claim:

1. For a screw cutting lathe having a carriage, an apron on the carriage, and a lead screw, apparatus for controlling the incidence of commencement of successive cuts comprising engagement means for engaging the lathe carriage with the lead screw, a lever pivotally attached at one end to the apron and carrying said engagement means at the other end, spring means constantly urging said lever with said engagement means towards its disengagement position, an arm pivotally attached to the apron, means for transmitting movement from said arm to said lever for moving the lever and engagement means into engaging position against the action of the spring means upon actuating of said arm, a spindle rotatably mounted in the apron, a peripherally slotted disc mounted on said spindle and lying underneath said lever, a pinion fast on the spindle and in mesh with the lead screw, and a pin rigidly connected to said other end of said lever and engageable with the periphery of said disc when said lever is urged towards the engaging position so as to prevent further movement of said lever to the engaging position until a slot in the disc is aligned with the pin.

2. An apparatus as set forth in claim 1, wherein the means for transmitting movement from the arm to the lever comprises an oscillatory member connected to said arm for oscillation thereby, spaced pins on said member, a cam slot on said lever, one of said pins engaging said cam slot for operating said lever, and a locking slot on said lever for engaging the other of said pins for locking the engaging means in engaged position.

References Cited in the file of this patent

UNITED STATES PATENTS

| | | |
|---|---|---|
| 558,713 | Bloemker | Apr. 21, 1896 |
| 679,238 | Monahan | July 23, 1901 |
| 1,075,301 | Peterson | Oct. 7, 1913 |
| 1,297,285 | Wood | Mar. 11, 1919 |
| 1,548,576 | Bachtel | Aug. 4, 1925 |
| 1,902,657 | Merwin et al. | Mar. 21, 1933 |
| 2,551,968 | Ruatti | May 8, 1951 |